Patented Feb. 14, 1950

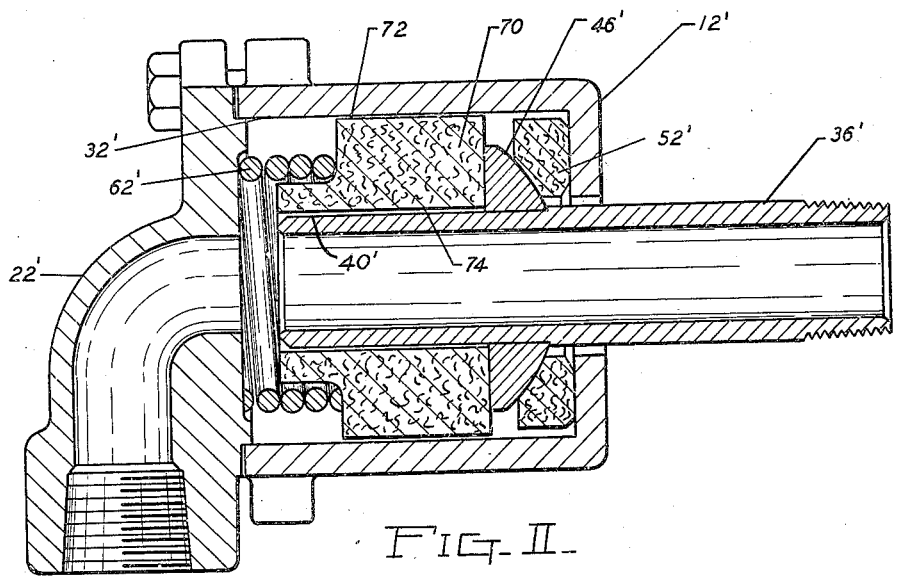
FIG. II
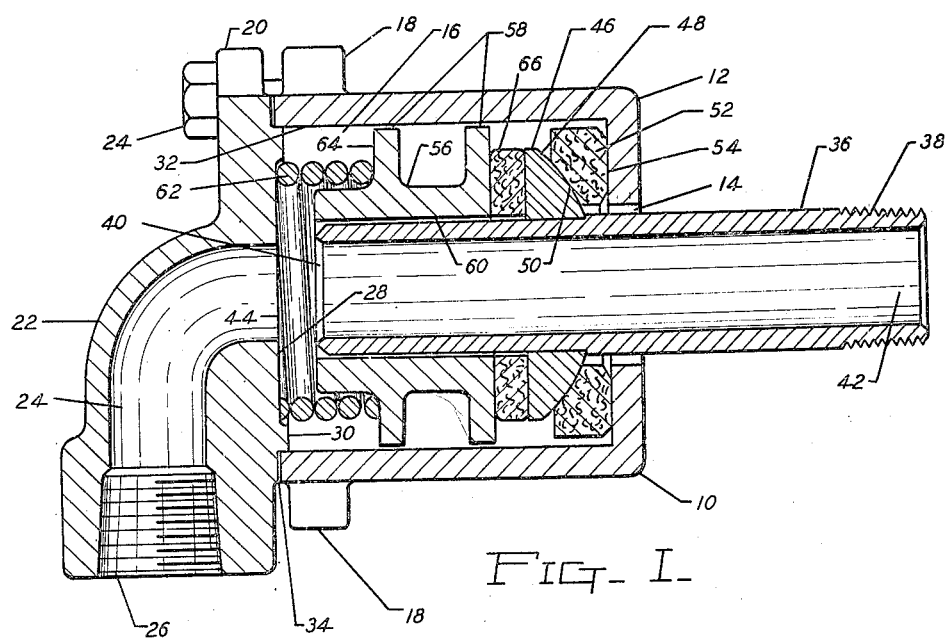
FIG. I

2,497,183

UNITED STATES PATENT OFFICE 2,497,183

SWING JOINT

Rollo O. Monroe, Three Rivers, Mich., assignor to The Johnson Corporation, Three Rivers, Mich., a corporation of Michigan Application April 30, 1947, Serial No. 744,855

2 Claims. (Cl. 285—97.6)

REISSUED
NOV 28 1950
RE 23229

The present invention relates to improvements in swing joints required to introduce steam and water into platen presses and the like.

Because of operational strain, weight of piping, and other conditions peculiar to the connection of a plurality of joints to the movable and stationary sections of platen presses and similar structures, rotary joints of the type disclosed in my Patent 2,385,421 cannot be used, as there is no adequate support for the joint.

Then it becomes an object of the present invention to provide an improved joint for both rotary and swing service which is self-supporting.

Another object is to provide a joint of the type described in which the component parts of the joint are self-supporting, and in which a seal is provided with sufficient float to compensate itself to commercial manufacturing tolerances, irregular wear of the sealing parts, and any minor tendency toward oscillation of the component parts of the joints in service.

Another object is to provide a fluid joint of a self-supporting character in which a conduit or pipe section is supported for oscillating or rotary movement around its longitudinal axis in a guide supported in a fixed part of the joint, the guide being located to one side of a ball and socket type of seal embracing the pipe section with one element of the seal floated between the pipe section and the fixed part of the joint.

A further object is to provide a fluid joint as defined in the preceding paragraphs in which the guide and floated part of the seal are of carbon graphite construction.

These and other objects and advantages inherent in the combination and construction of the parts of this invention will be apparent from a consideration of the specification with the appended claims and accompanying drawings, in which, Fig. I is a view in section of a self-supporting fluid joint embodying the present invention, and Fig. II is a view in section showing a modification of the structure which supports the pipe section during its relative movement.

In Fig. I the joint 10 is shown as comprising a cup-shaped body portion 12 defining an axially positioned aperture 14, and enclosing a cylindrical chamber 16 within which the various parts are positioned. The body portion 12 is formed with an attachment flange 18 which mates with the attachment flange 20 of the fitting or connecting portion 22, the attachment flanges 18 and 20 being held together by attachment screws 24.

The fitting 22 encloses a fluid conduit 24 and presents a suitably threaded portion 26 for attachment to a source of fluid, not shown, and presents to the chamber 16 a relatively flat circular surface 28, the function of which will appear later, and the annular shoulder 30 which fits snugly against the inner wall 32 of body portion 12 when the parts thus far described are assembled, to aid in the positioning and sealing action of gasket 34.

The pipe 36 has a threaded end 38, and a plain end 40 to define the fluid conduit 42, which is normally positioned concentric to the end 44 of the fluid conduit 24. The pipe 36 projects through the aperture 14 into the chamber 16, wherein it supports the sealing portion 46, which is fixed and sealed to the pipe 36 for movement therewith. The sealing portion 46 is preferably a spherical segment, radially bored to receive the pipe 36, and presenting a convex spherical surface 48 for engagement with the concave spherical surface 50 of the annular sealing and thrust ring 52. The sealing ring 52 bears against the flat inner surface 54 of body portion 12, and I prefer to have it of a smaller diameter than the inside diameter of the body portion 12, so that the sealing ring 52 does not react to perform part of the stabilizing action, and no interference is set up to its slight floating action. The sealing ring 52 may be of carbon graphite and the sealing bearing 46 of some such material as bronze, to provide members with differing wearing characteristics under friction.

To stabilize the pipe 36 and to maintain it in axial alignment with the body portion 12, I provide an annular guide 56 with its outer peripheries 58 in bearing engagement with the inner surface 32 of body portion 12, and with its inner periphery 60 in bearing engagement with the pipe 36. The pipe 36 is free to rotate within the guide 56, and the peripheries 58 of the guide 56 maintain the pipe 36 concentric to the axis of the body portion 12. The spring 62, which is seated on the surface 28, is also seated on portion 64 of the guide 56, and tends to urge the guide 56 against the thrust ring 66, which urges the sealing bearing 46 against the sealing ring 52. The thrust ring 66 is preferably of carbon graphite and the guide portion 56 of some material such as bronze.

In the modification shown in Fig. II, I have substituted a combination guide and thrust ring 70, preferably made from some such material as carbon graphite, for the guide 56 and the thrust ring 66. The outer surface 72 of guide 70 is in bearing relationship with the inner surface 32' of the body portion 12' and the inner surface 74 is in bearing relationship with the pipe 36'. The spring 62' urges the combination guide and thrust bearing 70 against the sealing portion 46' which is in turn urged against the annular seal ring 52'. It has been found through experiment that the carbon graphite guide 70 has wear characteristics superior to those obtained when the metal guide 56 is used, while the joint retains its self-supporting and sealing features.

In the manufacture of the structure disclosed, the initial clearance between the outside diameter of the guides 56 and 70 and the inside of the fixed body 12 and 12' is in the order of .005". As there is no relative movement between these parts, the wear in service is nil. Between the outside diameter of the ends 40 and 40' of the pipe 36 and the inside diameter of the guides 56 and 70, the initial running clearance is in the order of .003". During an actual test of the joint disclosed in Fig. II, continuous operation at 1750 R. P. M. with water pressure between forty and fifty pounds per square inch over a long period of time only increased the interior running clearance of .003" in the order of .0015" to .002. Any slight tilting of the pipes 36 and 36' due to the initial clearance or increase in clearance due to wear may result in oscillation thereof upon movement relative to the body 12 and 12'. Except for the ball and socket sealing action of the parts 46, 46' and 52, 52' this oscillation will cause leakage.

Having described my invention, what I claim and desire to protect by Letters Patent is:

1. A fluid joint comprising a cup-shaped body portion, an attachment flange on said body portion, a fitting adapted for attachment to a relatively stationary part and presenting an attachment flange to join with said first flange, a nipple, movable on its longitudinal axis, projecting through an opening in said body portion said opening providing circumferential clearance with the nipple, a spherical segmental sealing portion on said nipple, a spherical segmental sealing ring floatingly mounted within said body portion in sealing relationship with said sealing portion and said body portion, a cylindrical guide in which one end of said nipple is journaled and within said body portion, and a spring seated on said guide and adapted to urge said guide against said sealing portion.

2. A self supporting pipe joint for relatively movable pipe sections, comprising a cup-shaped body portion having an aperture defined in one wall of said body portion, a fixed pipe fitting attached to said body portion, a rotatable connecting pipe projecting through said aperture with an all round clearance, a convex-faced sealing ring axially received over said pipe and connected thereto for movement therewith, a concave-faced sealing ring floatingly positioned between said first ring and said body portion and co-acting with said first ring to provide a seal between said pipe and body, said concave faced sealing ring having clearance with the said pipe and with the body portion, whereby to permit the ring to partake of a slight floating movement in a direction perpendicular to the longitudinal axis of the pipe to accommodate slight tilting movements of the pipe a guide telescopically received over said pipe and within said body portion and maintaining said pipe in axial alignment with said body portion, and sprng means resiliently urging said guide toward said rings.

ROLLO O. MONROE.

REFERENCES CITED

The following references are of record in the file of this patent:

UNITED STATES PATENTS

| Number | Name | Date |
| --- | --- | --- |
| 1,580,462 | Woodruff | Apr. 13, 1926 |
| 1,899,785 | Woodruff | Feb. 28, 1933 |
| 1,200,151 | Burkhardt | May 7, 1940 |